United States Patent

Kirkwood et al.

[15] 3,701,842

[45] Oct. 31, 1972

[54] COLOR COMPENSATING NETWORK WITH RANGE LIMITATION

[72] Inventors: Loren Robert Kirkwood; Larry Allen Cochran; Robert Dale Altmanshofer, all of Indianapolis, Ind.

[73] Assignee: RCA Corporation

[22] Filed: Jan. 4, 1971

[21] Appl. No.: 103,699

[52] U.S. Cl....178/5.4 HE, 178/5.4 AC, 178/5.4 MC

[51] Int. Cl.............................H04n 9/48, H04n 9/50

[58] Field of Search.........178/5.4 HC, 5.4 AC, 5.4 R

[56] References Cited

UNITED STATES PATENTS 3,595,988 7/1971 Kawamata............178/5.4 HE

*Primary Examiner*—Richard Murray
*Assistant Examiner*—John C. Martin
*Attorney*—Eugene M. Whitacre

[57] ABSTRACT

Pending U.S. Pat. applications Ser. No. 36,045, filed May 11, 1970, entitled "TINT CORRECTION CIRCUITS", now U.S. Pat. No. 3,619,487 and Ser. 103,714, filed concurrently herewith, entitled "-COLOR COMPENSATING NETWORK FOR AN INTEGRATED CIRCUIT TELEVISION RECEIVER" describe arrangements for improving flesh tone rendition in a reproduced image through a selective reduction in Q channel signal gain. The present invention utilizes a switch to energize circuitry—as in the disclosures of the above-noted applications—to effect such gain reduction in the presence of spurious phase errors of the color signal burst relative to the color subcarrier, and additionally connects the switch in a manner to limit the range of saturation and tint control changes at the same time. This compression of possible range is in a direction to reduce the amount of color variation which could otherwise be introduced into the image by a viewer misadjusting such available controls when his receiver is in its flesh tone mode of operation.

9 Claims, 4 Drawing Figures

Fig. I

INVENTORS
Loren R. Kirkwood
Larry A. Cochran and
Robert D. Altmanshofer
BY Charles Brodsky
ATTORNEY INVENTORS
Loren R. Kirkwood
Larry A. Cochran and
Robert D. Altmanshofer
BY Charles Brodsky
ATTORNEY

*INVENTORS*

*Loren R. Kirkwood*
*Larry A. Cochran and*
*Robert D. Altmanshofer*

BY Charles Brodsky
ATTORNEY

COLOR COMPENSATING NETWORK WITH RANGE LIMITATION

BACKGROUND OF THE INVENTION

1. Field of the Invention

This invention relates to color television receivers and, more particularly, to modifications of the switching networks described in U.S. Pat. applications Ser. No. 36,045, filed May 11, 1970, entitled "TINT CORRECTION CIRCUITS" now U.S. Pat. No. 3,619,487 and Ser. No. 103,714, concurrently filed herewith, entitled "COLOR COMPENSATING NETWORK FOR AN INTEGRATED CIRCUIT TELEVISION RECEIVER." The inventions of these applications—as well as the invention of this instant case—have been assigned to the RCA Corporation.

2. Description of the Prior Art

Both patent applications noted above describe the existence of such errors in the propagation path between the television transmitter and the cathode-ray kinescope of a color receiver as give rise to the incorrect rendition of flesh tones in a reproduced image. Both applications also describe the improvements which could be obtained in flesh tone reproduction through the reduction of the Q channel signal gain of the receiver—by selectively attenuating the output signal of at least the B-Y color demodulator and by phase shifting the reference carrier oscillator signal applied to at least the R-Y and B-Y demodulators. Such Q channel gain reduction was effected, in each instance, by the actuation of a switch which inserted appropriate circuit components into the chrominance path of the receiver—to, for example, attenuate the demodulator output signal coupled to the B-Y amplifier, to nominally phase shift the reference carrier signal developed by the burst locked oscillator and applied to the R-Y demodulator, and to additionally phase shift that carrier as applied to the B-Y demodulator to impart an overall phase shift which is greater than that imparted to the oscillator signal applied to the R-Y demodulator.

SUMMARY OF THE INVENTION

As will become clear hereinafter, the apparatus of the present invention comprises a modification of the switch configurations employed in these two color compensating networks, in that actuation of the switch not only effects the desired Q channel signal gain reduction, but additionally serves to limit the range over which the saturation and tint controls available for viewer adjustment can be changed. That is, whereas the described embodiments of the two pending applications illustrate the improvements which can be obtained in reproduced flesh tones, such constructions do not prevent the viewer from mis-adjusting either or both these controls, to thereby vary the flesh tones as well as the other colors of the overall display. Variations of this type--while virtually minimized in an automatic color compensating system of the type described in pending U.S. Pat. application Ser. No. 57,280, (now U.S. Pat. No. 3,663,744) filed July 22, 1970, entitled "-SELECTIVE TINT CORRECTION CIRCUITS," and assigned to the same assignee as the previously noted applications—can thus deleteriously affect the intended result of reducing the green-purple tints in such objects as faces and hair, which render the reproduced color image more acceptable to the viewer.

As will be seen below, each of the two embodiments of the present invention serve to shunt the tint control with an added impedance when switching to the flesh tone mode of operation, so as to compress the range of impedances offered to the tint adjusting circuitry of the receiver. In the first of these embodiments, actuation of the switch also shunts the saturation control with a similar impedance, thereby limiting the range of possible saturation control impedance changes in the same way. In the second embodiment to be described, on the other hand, the switch configuration inserts two fixed impedances in series with the saturation control, and thereby limits the amount of control voltage obtainable for use in varying the degree of color saturation in the reproduced picture.

BRIEF DESCRIPTION OF THE DRAWINGS

These and other advantages of the instant invention will be apparent from a consideration of the following detailed description taken in connection with the accompanying drawings in which.

DETAILED DESCRIPTION OF THE DRAWINGS

Figure 1:
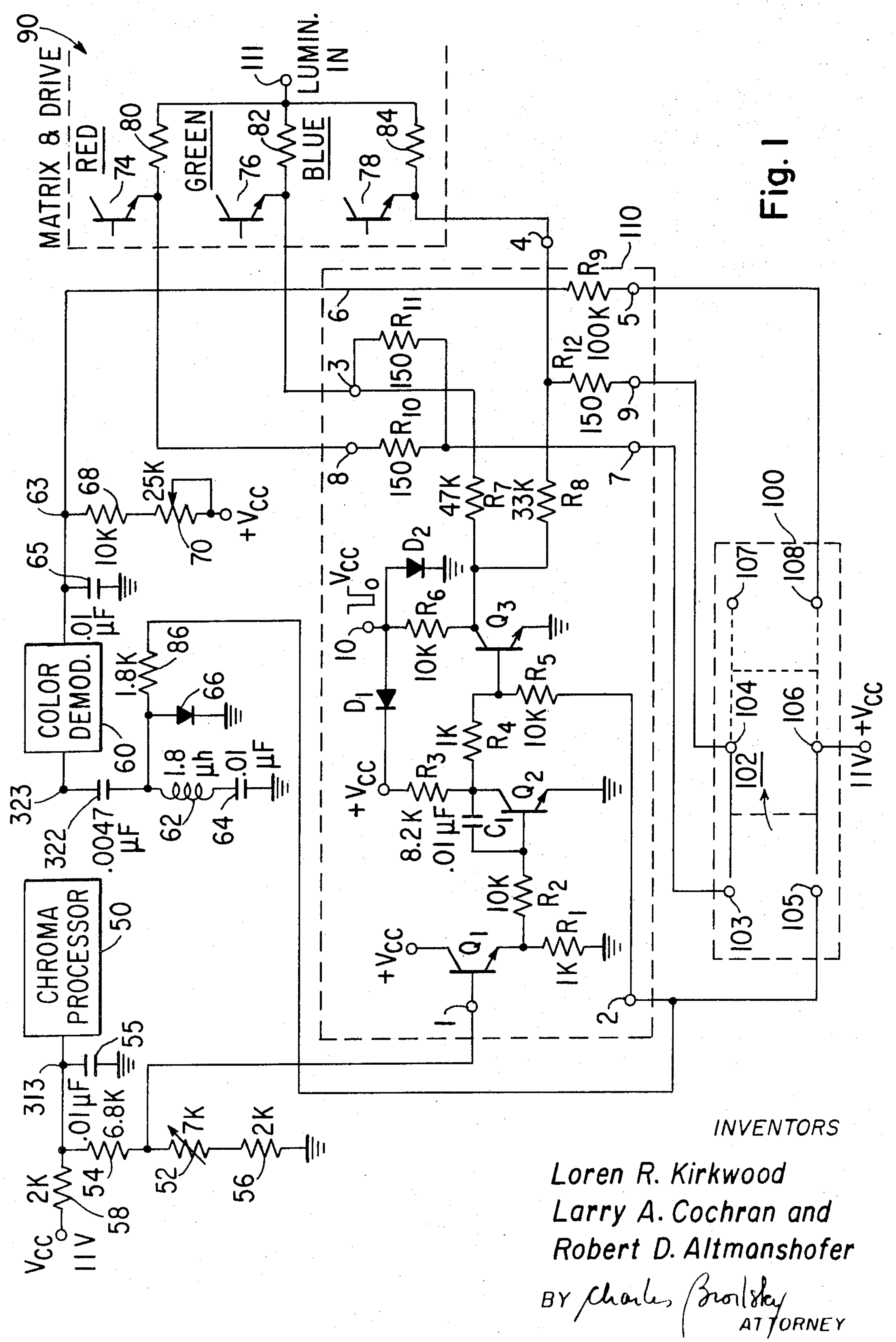
FIG. 1 is a schematic diagram, partly in block form, of the color compensating network described in the Ser. No. 103,714 application to improve flesh tone reproduction in a receiver design utilizing integrated circuit devices in the color processing channels.
Figure 2:
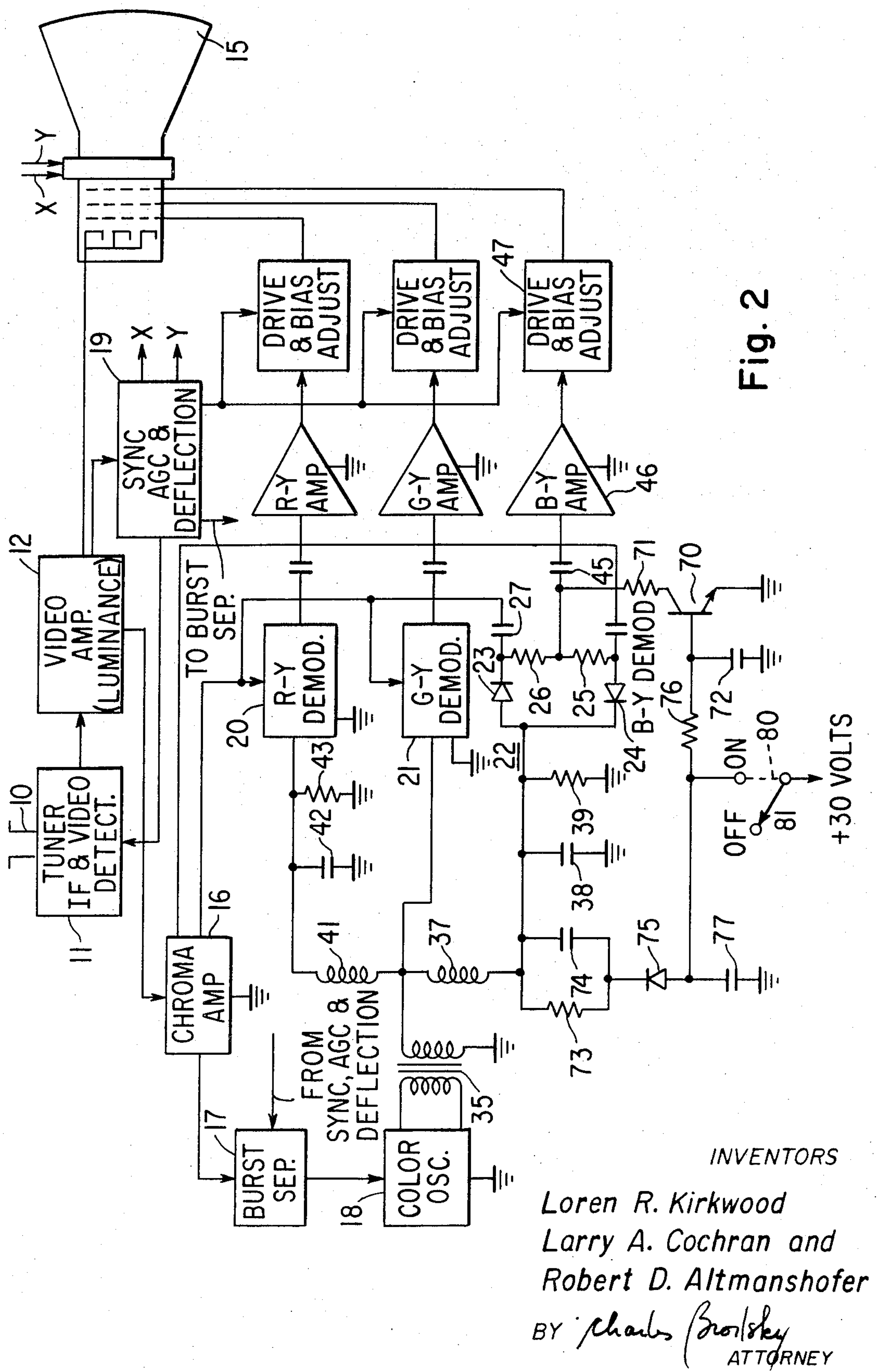
FIG. 2 is a schematic diagram, also partly in block form, of the tint correction circuit of the Ser. No. 36,045 application (U.S. Pat. 3,619,487), as utilized in improving flesh tone reproduction in a receiver design employing discrete circuit components in the color processing channels.

In order to simplify the following description and to more particularly point out the distinctive features of the present invention, only those portions of the color compensating network of FIG. 1 and tint correction circuit of FIG. 2 which are essential to a proper understanding of the instant case will be considered. Further description can be had from the disclosures of the two noted applications covering such arrangements, which applications are incorporated herein by reference.

For present purposes--and with specific reference to the network of FIG. 1—, it will be understood that the switch which actuates the Q channel signal gain reduction circuitry is illustrated by the reference numeral 102, included in a switch module 100. The solid line position shown for the switch 102 is employed where the color transmission appears proper and propagation path disturbances are minimal, while the dotted line position is employed where improvement of flesh tone rendition appears desirable. With switch 102 in the dotted line position, selective attenuation of the output signal of the B-Y demodulator is accomplished relative to the attenuation of the demodulated R-Y and G-Y output signals through the exclusion of a resistor $R_{12}$, included in FIG. 1 on a color compensating module 110. This resistor $R_{12}$ shunts the input signal network of a matrix and drive amplifier transistor 78, included in a module 90 which is fully described in U.S. patent application Ser. No. 37,780, filed May 15, 1970, entitled "-VIDEO AMPLIFIERS", (now U.S. Pat. No. 3,619,488) also assigned to the assignee of this case. The nominal phase shift of the reference oscillator signal applied to the R-Y and B-Y color demodulators is effected when switch 102 is in its dotted line position by means of a resistor $R_9$ on the compensating module 110. This resistor $R_9$ is placed in shunt with the series combination of a resistor 68 and tint control potentiometer 70 and across an input network of an integrated circuit color demodulator block 60, of the type described in U.S. Pat. application Ser. No. 884,227, filed Dec. 11, 1969, entitled "PHASE SHIFT CIRCUITS," (now Patent 3,597,639), and assigned to the same assignee as the previously noted applications. As is therein described, such tint control circuitry as includes the potentiometer 70 effects a direct current division in a differential amplifier stage to cause a phase angle change in the supplied reference oscillator signal as the control is varied. Shunting such tint control potentiometer 70 with the module resistor $R_9$, as in the concurrently filed application, thus changes the current division in a similar manner to attain the nominal phase shift desired. Lastly, the further phase shift provided to the reference carrier signal applied to the B-Y demodulator is achieved by removing the forward bias on the rectifier 66 coupled to the input of the demodulator 60, and across a resonant circuit including an inductor 62 and a capacitor 64. Such forward bias is applied when the switch 102 is in its solid line, or normal, position, but is removed when the switch 102 is moved to its dotted line, or flesh tone improvement, position. The added L-C combination serves to alter the signal phase such that the reference carrier is applied to the B-Y demodulator with a greater phase shift than when applied to the R-Y demodulator.

The arrangement of FIG. 1 also includes apparatus for shifting the color temperature of the cathode-ray kinescope, to further improve the flesh tone rendition in the manner described in the Ser. No. 103,714 case. Such temperature shifting is accomplished through the injection into the kinescope circuitry of negative-going pulses applied at a terminal point 10 of the module 110, but only during a color transmission and only when the switch 102 is in its dotted line position. During a monochrome transmission, the chroma processing circuitry of the type included in a further integrated circuit block 50 of FIG. 1—described in U.S. Pat. application Ser. No. 822,951, filed May 8, 1969, entitled "AUTOMATIC CHROMA CONTROL CIRCUITS," (now U.S. Pat. No. 3,604,842) and assigned to the common assignee of all the afore-mentioned cases—develops a control voltage at the junction of a resistor 54 with a saturation control potentiometer 52 of an amount which is insufficient to render a transistor $Q_3$ of the module 110 nonconductive. In such instance, the injected negative-going pulses are coupled to ground, instead of to the kinescope through the matrix and drive module 90 of the Ser. No. 37,780 case (now U.S. Pat. No. 3,619,488). Similarly, when switch 102 is in its solid line, or normal position, a positive voltage $+V_{cc}$ applied by means of switch 102 through a resistor $R_5$ of the module 110 to the base electrode of transistor $Q_3$ also keeps that transistor from becoming nonconductive. Further details as to the construction and/or operation of any of the units shown in FIG. 1 may be had by refering to the appropriate applications noted.

The discrete circuit arrangement of FIG. 2 similarly effects a Q channel signal gain reduction in response to the actuation of a switch, illustrated herein as the single pole, single throw switch 80. The selective attenuation feature needed to reduce the amplitude of the B-Y demodulator output signal is provided by a load resistor 71, coupled between the B-Y demodulator output junction of resistors 25, 26 and ground, when a positive voltage applied through switch 80 saturates the illustrated transistor 70. The nominal phase shift for the R-Y and B-Y demodulators follow from the loading on the secondary winding of an oscillator transformer 35, by a network including resistor 73 and capacitor 74 when switch 80 is thrown so that a positive voltage +30v forward biases an included rectifier 75. At the same time, this R-C shunt network is inserted in parallel with capacitor 38 and resistor 39 across the input to the B-Y demodulator 22, to further shift the carrier applied to that demodulator. As will be readily apparent, this resultant combination serves to phase shift the reference carrier for the B-Y demodulator an amount greater than that by which an included capacitor 42 and resistor 43 phase shift the carrier prior to its application to the R-Y demodulator 20. As described in the Ser. No. 36,045 application (now U.S. Pat. No. 3,619,487), this insertion of the network 73, 74 serves to shift the carrier applied to the B-Y demodulator 30° more than the corresponding phase shift applied to the R-Y demodulator supplied signal. Although not specifically shown, it will be apparent to one skilled in the art that a saturation control may be included in the chrominance amplifier section 16 of the FIG. 2 construction, to vary the amplitude of the chrominance component coupled to the three demodulators shown, while a tint control may be coupled in any appropriate manner across the secondary winding of the oscillator transformer 35, to vary the oscillator signal phase relative to the color bursts of the chrominance signal. Further description as to the construction and/or operation of the arrangement of FIG. 2 can be had by refering to the Ser. No. 36,045 application noted (U.S. Pat. No. 3,619,487).

Both the integrated circuit version of the reduced gain Q apparatus and the discrete circuit version have been constructed and observed to operate quite satisfactorily. It was noted, however, that adjustments of the saturation and tint controls could continue to be made even after the appropriate energizing switches 102, 80 were thrown, and that such changes could vary not only the flesh tones of the reproduced image but the other colors as well. Thus, with the arrangement shown in FIG. 1—and with the values as there illustrated—a tint control range of some 9–26 kilohms exists as the control 70 is adjusted from one end to the other, to vary the direct current division which causes the reference carrier signal to be phase shifted. Similarly, with the saturation control circuitry there shown—and assuming the forward current gain of transistor $Q_1$ to be about 35—, the impedance at the junction of resistors 52 and 54 ranges between some 2–7 kilohms or so as the saturation control 52 is adjusted to vary the amplitude of the developed chrominance signal. Comparable control range variations also exist with the FIG. 2 construction, with the overall result being that the amplitudes of the developed R-Y, B-Y and G-Y color difference signals tend to vary as a function of the tint and/or saturation control settings. Such operations are to be contrasted, on the other hand, with the color compensating arrangement of the previously noted Ser. No. 57,280 application (now U.S. Pat. 3,663,744), where any changes in tint positioning is compensated by the feedback network there described, to automatically maintain proper flesh tone and color renditions.

Figure 3:
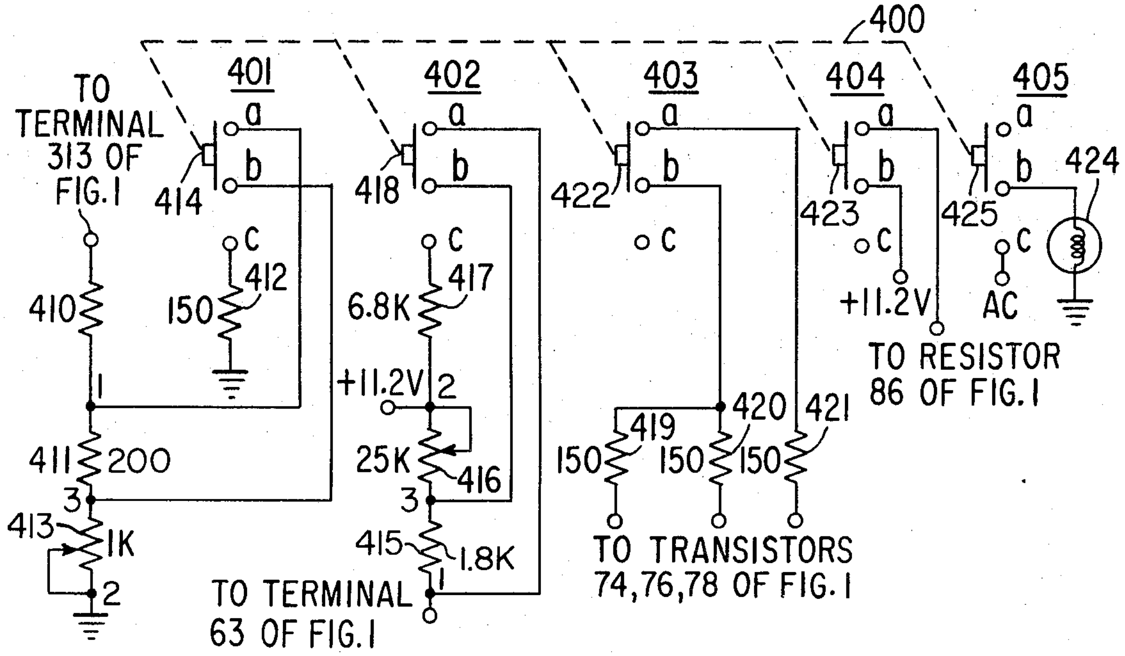
FIG. 3 shows a first embodiment of a switch structure arrangement according to the present invention for use with the color compensating network of FIG. 1.
Figure 4:
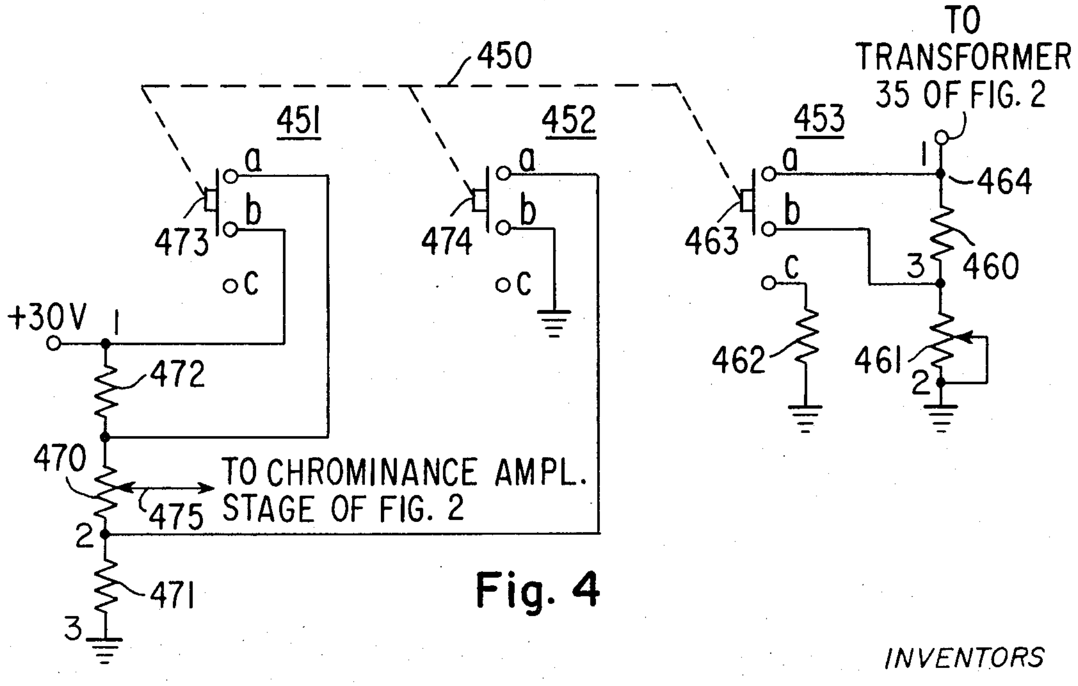
FIG. 4 shows a second embodiment of such a switch structure arrangement for use with the tint correction circuit of FIG. 2.

As will be seen from a description of FIGS. 3 and 4 which immediately follow, the present invention serves to reduce these deleterious effects on image reproduction by rearranging the switching configurations by means of which the Q reduction circuits are brought into operation. In both the FIG. 3 and FIG. 4 arrangements, it will be seen that actuation of the switch employed additionally shunts the tint control potentiometer and reduces the range of impedances capable of affecting the phase shift of the reference oscillator signal by some two-thirds and more. The actuation of the switch also reduces the range of the saturation control impedances, for the FIG. 3 embodiment through a similar shunt arrangement, and for the FIG. 4 embodiment through a limiting of the voltage developed by the control potentiometer by means of fixed impedances inserted in series with the control. With either arrangement, even if the viewer should adjust the available tint or saturation controls of his receiver during its operation in the improved flesh tone mode, the overall effect in varying these elements over their entire operating range will be seen to be significantly reduced.

Thus, the arrangement of FIG. 3 schematically illustrates various connections which are made to the double pole-double throw switch 102 of FIG. 1 to effect this described compression of available tint and saturation control range. A ganged switch 400 is shown, having individual sections 401–405. The saturation control section 401 includes fixed resistors 410–412 and a variable resistor 413 which serves as the saturation control for the receiver. As indicated, resistors 410, 411 and 413 are serially coupled between terminal 313 at the input of the chroma processing unit 50 of FIG. 1 and a point of ground potential. A first terminal *a* of the section 401 is connected to the junction between resistors 410 and 411 while a second terminal *b* is connected to the junction between resistors 411 and 413. A third terminal *c* of the section is coupled to ground by resistor 412. The illustrated position of the section 401 connecting the terminals *a*, *b* represents the position of normal or conventional color reproduction (the solid line position of FIG. 1) and, in this position, resistor 411 is short circuited by the switch link 414. Resistor 412 is, at the same time, outside of any circuit construction.

When improved flesh tone reproduction is desired, the switch 400 is thrown and the link 414 of the section 401 is automatically moved to connect terminals *b* and *c* of the section. This connects resistor 412 across the saturation control potentiometer 413 such that the total resistance it presents to terminal 313 of the FIG. 1 construction at any one time is reduced. By selecting the resistance value of resistor 412 to be substantially less than the maximum value of resistance for the control 413, the effective range of resistances which is available between the terminal 313 and ground due to the variable potentiometer setting is significantly reduced. Thus, where the control 413 is, as shown, a 1 kilohm resistor and the resistor 412 has a resistance value of 150 ohms, the impedance at the junction of resistor 411 and 413 as the potentiometer 413 is adjusted over its 1K range now varies between 0 and approximately 125 ohms. The range of impedances at resistor 411 is thereby cut down by a factor 8:1 by virtue of this resistor shunting. The short circuit across resistor 411 is also removed when the switch 400 is thrown, inserting it in series with the potentiometer 413. The resistance value for resistor 411 is selected of the same order of magnitude as resistor 412 (e.g. 200 ohms) and, in association with the resistor 410 such that the total resistance coupled to the chroma processing terminal 313 in this flesh tone mode is approximately the same as in the normal position of the switch 400. With such values, the range of direct voltages coupled from the saturation control circuitry to the input of the Ser. No. 822,951 (U.S. Pat. No. 3,604,842) chroma processing chip to bias the amplifier stages thereof is approximately the same for both positions of the switch 400, but the range of the color control becomes desirably limited due to the presence of the shunting resistor 412.

The tint control section 402, on the other hand, includes a fixed resistor 415 and the variable tint control potentiometer 416 serially coupled in the order named between terminal 63 of the color demodulating block 60 of FIG. 1 and the point of 11.2v $+V_{CC}$ potential as there shown. A further resistor 417 is included, to be coupled across the control potentiometer 416 when flesh tone improvement is desired. Thus, one terminal *a* of the switch section 402 is shown connected to the junction of resistor 415 and the demodulator terminal 63 while a second terminal *b* is connected to the junction of resistor 415 and potentiometer 416. The resistor 417 is, as illustrated, connected between the terminal *c* of the switch section 402 and the $+V_{cc}$ point of energizing potential. It will be seen that in the normal position of the switch section 402, switch link 418 connects the two terminals *a*, *b* to short circuit the resistor 415 and, also, to hold resistor 417 un-connected within any circuit loop. When flesh tone improvement is desired, and the switch 400 is thrown to automatically move the link 418 to connect terminals *b* and *c*, the short circuiting of resistor 415 is removed—similarly, as with the resistor 411 of the saturation control section 401—and resistor 417 is connected cross the control potentiometer 416. Whereas the impedance presented to terminal 63 for the normal switch position covers the illustrated 25 kilohm range of the potentiometer 416, with the arrangement shown—and in the flesh tone position of the switch—the available range extends only over some 5 kilohms, from 1.8KΩ to approximately 7.0KΩ. Again, the effective range of impedance presented is significantly reduced, and the direct current division in the color demodulator section of the Ser. No. 884,227 (now U.S. Pat. 3,597,639) described chip is similarly reduced to limit the phase change possible with adjustment of the available tint control 416.

The switch section 403 corresponds, as shown, to the selective attenuation arrangement of FIG. 1 in that, in the normal switch position where a link 422 connects the section terminals *a*, *b*, each of the resistors 419–421 is connected together in a Y configuration across the emitter electrodes of the matrix drive transistor 74, 76, 78 in FIG. 1. In the flesh tone position where the switch link 422 connects the terminals *b*, *c*, only resistors 419, 420 are coupled to shunt the transistor emitter electrode, as described in the concurrently filed Ser. No. 103,714 case.

Similarly, switch section 404 illustrates the coupling of the $+V_{cc}$ positive potential needed to forward bias the rectifier 66 at the B-Y demodulator 60 of FIG. 1 when the switch 400 is in its normal position, causing the link 423 to connect the *a* and *b* terminals. In the flesh tone mode of operation, on the other hand—where additional phase shift is needed for the oscillator signal coupled to the demodulator 60—the throwing of the switch 400 moves the link 423 to connect the *b* and *c* terminals of the section 404, thereby removing that bias and adding the L-C combination of inductor 62 and capacitor 64 in FIG. 1 to further phase shift the reference carrier. Also shown in the embodiment of FIG. 3 is the use of a light indicator, such as a pilot bulb 424, which is illuminated when the link 425 of switch section 405 is moved to connect its *b* and *c* terminals to a power source (AC) when the energizing switch 400 is thrown.

The embodiment of FIG. 4 is similar to that of FIG. 3 in that the normal connection of the ganged energizing switch short circuits a first fixed resistor (411, 415 in FIG. 3) and open circuits a second such resistor (412, 417). It is also similar in that movement of the switch to its flesh tone position inserts the first resistor in series with an appropriate control potentiometer (413, 416) and, at the same time, shunts that variable element with the second resistor. Thus, the switch 450 in FIG. 4 includes a section 453 having a first terminal *a* coupled to a point of ground potential through a first fixed resistor 460 and a variable tint control potentiometer 461, and also having a second terminal *b* connected to the junction of these two resistances. A third terminal c of the section 453 is coupled to ground by the second fixed resistor 462.

With the switch 450 in its normal position such that a link 463 connects the terminals a and b, resistor 460 will be seen to be short circuited and resistor 462 will be seen to be omitted from any closed circuit loop. Phase shifts are thus controllable over the entire range of the tint control potentiometer 461, coupled as indicated from a point 464 to the secondary winding circuitry of the oscillator transformer 35 of the Ser. No. 36,045 case (now U.S. Pat. No. 3,619,487), as reproduced in FIG. 2 herein. Upon switch-over to the flesh tone mode, however, terminals *b* and *c* become connected by link 463 to insert resistor 460 into the circuit and to couple resistor 462 across the control potentiometer 461. The resistive impedance thus offered to the tint control circuitry at point 464 is restricted at the low end of potentiometer 461, to the value of the resistor 460 and at the high end of the potentiometer, to the value of the series combination of resistor 460 and the effective parallel connection of the resistors 461, 462. The maximum impedance range offered to the tint control circuitry can thus be significantly reduced as contrasted with the normal mode of operation, simply through proper selection of the values of resistors 460, 462 relative to the maximum resistance of the potentiometer 461. The effect of thus limiting the range of impedance is, as with the arrangement of FIG. 3, to limit the amount of phase shift possible during the flesh tone improvement operation. Compression of the impedance range in this manner also reduces the phase shifts of the oscillator signal coupled to the R-Y and G-Y demodulators of FIG. 2 so that variations in the other reproduced colors of the image are restricted as well.

A somewhat different arrangement is employed for restricting the range of the saturation control in that no resistance-shunting of the control is employed. As indicated, the control 470 is coupled between ground and the source of its operating potential +V(30v) by a first fixed resistor 471 having its opposite end connected to ground and by a second fixed resistor 472 having its remote end coupled to the +V energizing source. In the normal mode of color reproduction, terminals *a* and *b* of a switch section 451 are connected by a link 473, which effectively short circuits resistor 472 when terminal *a* of the section is coupled to the junction of potentiometer 470 and resistor 472 and terminal *b* is coupled to the +V supply. The resistor 471 is also short circuited during a normal color operation, by a second switch section 452 having a link 474 connecting the switch terminals *a* and *b* when terminal *a* is coupled to the junction between potentiometer 470 and resistor 471 and when terminal *b* is coupled to ground. In such instance, the range of direct voltages available at the slider 475 of the control 470 is determined solely by the value of the source +V and the potentiometer setting.

However, when the switch 450 is moved to the flesh tone mode of operation, link 473 moves to connect terminals *b* and *c* of the section 451 to insert resistor 472 between potentiometer 470 and the +V energizing source while link 474 moves to connect the corresponding terminals of section 452 to insert resistor 471 between potentiometer 470 and ground. Due to the inclusion of these resistors 471, 472, the direct voltage developable at the slider 475 of potentiometer 470 for the same control setting is reduced. Additionally, that voltage can no longer vary between zero volts and the value of the source +V as before, since the voltage which can possibly be developed is limited by the drops developed across those two resistors. As a result, the range of saturation control is also significantly reduced.

While there have been described what are considered to be preferred embodiments of the present invention for operation with the color compensating circuit of FIG. 1 and with the tint correction circuit of FIG. 2, it will be readily apparent to those skilled in the art that other modifications may be made without departing from the intents and purposes of the invention as disclosed herein. Thus, whereas the saturation control arrangement of FIG. 4 is shown as varying the voltage developed at the slider of the potentiometer element, it will be readily seen that constructions of paralleling resistors as employed for the tint control of that construction—as well as for the tint and saturation controls of FIG. 3—may be employed instead. It is therefore contemplated that the appended claims be read in the true spirit and scope of the present teachings as set forth. Thus, it will be seen that the described embodiments each attain flesh tone improvements in manners identical to those disclosed in the referred-to applications, Ser. No. 36,045 (now U.S. Pat. No. 3,619,487) and 103,714 (concurrently filed herewith), while compressing the range of available saturation and tint controls so as to limit the possible misadjustment made by a viewer changing those settings when his set is in its flesh tone mode of operation. Not only will flesh tones be kept comparatively constant during such reduced range, but variations from desired reproduction of other colors will be kept small, as well.

For ease in corresponding the claim terminology with the disclosed embodiments of FIGS. 3 and 4, it will be seen that the numbers 1–3 along side the respective switch structures correspond to the similarly noted terminal designations of the claims.

What is claimed is:

1. In a color television receiver of the type having variable saturation and tint controls and providing improvements of flesh tone rendition through a reduction of Q channel signal gain by (a) shifting the phase of the reference oscillator signal applied to a first color demodulator of said receiver by an amount greater than the phase shift imparted to the reference oscillator signal applied to an included second color demodulator and (b) by further selectively attenuating at least the demodulated output signal of said first demodulator when synchronously applied with chrominance signals representative of the flesh tones to be reduced, and wherein said Q channel gain reduction is actuated by a controllably operative switch having a first conditional mode of operation for normal reproduction of color images and a second conditional mode of operation for reproduction of said images with improved flesh tone rendition, the improvement comprising:

means responsive to the placement of said switch in its second conditional mode of operation for limiting the range over which at least one of said controls will be effective in changing the saturation and tint characteristics of the flesh tone improved reproduced image, said means comprising:

first and second impedances;

first, second and third terminals;

first means responsive to the placement of said switch in its second conditional mode of operation for intercoupling said first impedance with the control whose range of effectiveness on the reproduced image is to be selectively limited, and in series connection with said control between said first and second terminals; and second means similarly responsive to the placement of said switch in its second conditional mode of operation for intercoupling said second impedance with said selected control, and between said second and third terminals;

such that when said switch is placed in its first conditional mode of operation for removing the limitation on the range over which said selected control is to be effected, said first and second terminals are interconnected substantially only by said control and a short-circuited impedance.

2. The improvement of claim 1 wherein the placement of said switch in its first conditional mode of operation short-circuits said first impedance and open-circuits said second impedance.

3. The improvement of claim 1 wherein the placement of said switch in its first conditional mode of operation short-circuits said first and said second impedances.

4. The improvement of claim 2 wherein the placement of said switch in its second conditional mode of operation connects said second impedance in parallel across said selected control.

5. The improvement of claim 3 wherein the placement of said switch in its second conditional mode of operation inserts said second impedance in further series connection with said first impedance and said selected control.

6. The improvement of claim 4 wherein said first terminal is coupled to utilization means within said Q channel to effect said desired change of at least one of said saturation and tint characteristics of the reproduced image.

7. The improvement of claim 5 wherein a variable arm on said selected control is coupled to utilization means within said Q channel to effect said desired change of at least one of said saturation and tint characteristics of the reproduced image.

8. The improvement of claim 6 wherein said second impedance comprises a resistor having an impedance value substantially less than the available maximum impedance of said selected control.

9. The improvement of claim 8 wherein said first impedance also comprises a resistor having an impedance value substantially less than the available maximum impedance of said selected control.

* * * * *